United States Patent
Tanaka et al.

(10) Patent No.: US 12,555,006 B2
(45) Date of Patent: Feb. 17, 2026

(54) EXTRACTING ENRICHED TARGET-ORIENTED COMMON SENSE FROM GROUNDED GRAPHS TO SUPPORT NEXT STEP DECISION MAKING

(71) Applicant: International Business Machines Corporation, Armonk, NY (US)

(72) Inventors: Tsunehiko Tanaka, Chuo-ku (JP);
Daiki Kimura, Midori-ku (JP);
Michiaki Tatsubori, Oiso (JP)

(73) Assignee: International Business Machines Corporation, Armonk, NY (US)

( * ) Notice: Subject to any disclaimer, the term of this patent is extended or adjusted under 35 U.S.C. 154(b) by 830 days.

(21) Appl. No.: 17/812,757

(22) Filed: Jul. 15, 2022

(65) Prior Publication Data

US 2024/0028923 A1    Jan. 25, 2024

(51) Int. Cl.
*G06N 7/02* (2006.01)
*G06N 5/02* (2023.01)
*G06N 5/04* (2023.01)

(52) U.S. Cl.
CPC .................. *G06N 5/04* (2013.01); *G06N 5/02* (2013.01)

(58) Field of Classification Search
CPC ........ G06F 16/13; G06F 16/24; G06F 16/156; G06F 3/1297; G06N 3/00; G06N 5/00; G05B 13/00; H03M 7/30; H04N 9/8042; G06T 9/00
See application file for complete search history.

(56) References Cited

U.S. PATENT DOCUMENTS

| | | | | | |
|---|---|---|---|---|---|
| 6,032,142 | A | * | 2/2000 | Wavish | G06N 5/043 706/50 |
| 6,636,781 | B1 | * | 10/2003 | Shen | B25J 9/065 703/2 |
| 10,254,759 | B1 | * | 4/2019 | Faust | B60W 30/00 |

(Continued)

FOREIGN PATENT DOCUMENTS

KR    20210065066 A    6/2021

OTHER PUBLICATIONS

Chen, et al., "Improving Commonsense Question Answering by Graph-based Iterative Retrieval over Multiple Knowledge Sources," Coling (Year:2020) 12 pages.

(Continued)

*Primary Examiner* — Hung D Le
(74) *Attorney, Agent, or Firm* — CANTOR COLBURN LLP; Stosch Sabo (57) ABSTRACT

Aspects of the invention include systems and methods configured to extract enriched target-oriented common sense from grounded graphs to support efficient next step decision making of an autonomous agent. A non-limiting example computer-implemented method includes extracting common sense from a source. The extracted common sense can include a first knowledge graph. An environment state can be extracted from an observation. The extracted environment state can include a second knowledge graph. The second knowledge graph can include an interactive object and a state of the interactive object. A difference graph including the extracted common sense and the extracted environment state can be generated. A next action is selected based on the difference graph and the next action is taken by an autonomous agent.

20 Claims, 8 Drawing Sheets

(56) References Cited

U.S. PATENT DOCUMENTS

| | | | | |
|---|---|---|---|---|
| 2002/0156932 | A1* | 10/2002 | Schneiderman | H04L 67/34 719/317 |
| 2017/0171684 | A1* | 6/2017 | Badler | H04S 7/30 |
| 2018/0357083 | A1* | 12/2018 | Chauhan | G06N 20/00 |
| 2020/0033868 | A1* | 1/2020 | Palanisamy | B60W 60/00 |
| 2020/0033869 | A1* | 1/2020 | Palanisamy | G06N 3/092 |
| 2020/0034362 | A1* | 1/2020 | Galitsky | G06F 40/247 |
| 2020/0356855 | A1* | 11/2020 | Yeh | G06N 3/08 |
| 2022/0011776 | A1* | 1/2022 | Narang | G06N 3/094 |

OTHER PUBLICATIONS

Murugesan et al., "Efficient Text-based Reinforcement Learning by Jointly Leveraging State and Commonsense Graph Representations" Association for Computational Linguistics, (Year: 2021): pp. 719-725.

Murugesan et al., "Enhancing Text-based Reinforcement Learning Agents with Commonsense Knowledge" cs.AI, (Year: 2020), 10 pages.

Murugesan et al., "Text-based RL Agents with Commonsense Knowledge: New Challenges, Environments and Baselines," AAAI (Year: 2021), 14 pages.

Murugesan, et al., "Eye of the Beholder: Improved Relation Generalization for Text-based Reinforcement Learning Agents," AAAI, (Year: 2021) pp. 1-22.

Xu et al., "Automatic Extraction of Commonsense LocatedNear Knowledge" Association for Computational Linguistics, (Year: 2018): pp. 96-101.

Maheshwari, et al, "Scene Graph Embeddings Using Relative Similarity Supervision", arXiv preprint, 2021, 9 pages.

* cited by examiner

EXTRACTING ENRICHED TARGET-ORIENTED COMMON SENSE FROM GROUNDED GRAPHS TO SUPPORT NEXT STEP DECISION MAKING

BACKGROUND

The present invention generally relates to artificial intelligence (AI), and more specifically, to computer systems, computer-implemented methods, and computer program products for extracting enriched target-oriented common sense from grounded graphs to support efficient next step decision making of an autonomous agent.

Recent advancements in the fields of machine learning and artificial intelligence have provided an entirely new set of tools that can be used to solve a variety of otherwise difficult or impossible problems. These tools now approach or even outperform humans and conventional computing systems in an increasingly wide range of tasks, such as, for example, in image evaluation (e.g., computer vision) and healthcare (e.g., automated diagnoses). Due to these successes, the use cases of ever more sophisticated machine learning and/or artificial intelligence-based systems and models has expanded rapidly.

One emerging field involves the development of sophisticated autonomous agents. At its core, an autonomous agent should be able to assess its surroundings and make an informed decision as to its next action. The development goal for an autonomous agent is to design a neural network that accurately predicts, in response to some input stimuli, an optimal action to take (i.e., next step decision making).

SUMMARY

Embodiments of the present invention are directed to extracting enriched target-oriented common sense from grounded graphs for efficient next step decision making of an autonomous agent. A non-limiting example method includes extracting common sense from a source. The extracted common sense can include a first knowledge graph. An environment state can be extracted from an observation. The extracted environment state can include a second knowledge graph. The second knowledge graph can include an interactive object and a state of the interactive object. A difference graph including the extracted common sense and the extracted environment state can be generated. A next action is selected based on the difference graph and the next action is taken by an autonomous agent.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

An ideal autonomous agent can quickly assess novel surroundings and make correct decisions as to the proper responses or actions to take. To design an effective autonomous agent, however, requires solving a variety of problems. For example, an autonomous agent needs some means by which an input stimuli or observation (i.e., the current state) can be determined. Knowledge of the current state is not sufficient, however, and the autonomous agent also needs some mechanism for determining an appropriate response (i.e., a next action to take) based on the stimuli. Considerable advances in neural network architectures, natural language processing, computer vision, and computing power have resulted in great strides being made in the processing of input stimuli by autonomous agents. Improving next step decision making, though, has been very challenging.

One approach to next step decision making involves training the autonomous agent to leverage a predefined background knowledge base against the stimuli to determine an appropriate response. While promising, this type of approach to next step decision making has its own challenges, such as the construction of the knowledge base itself and the design of efficient machine learning architectures and algorithms by which the autonomous agent can search the background knowledge base when solving a task.

One illustrative example of such challenges is found in the testing of autonomous agents against text-based games. Text-based games are computer games where game states and action spaces are represented in pure texts. To play them, players must not only understand in-game texts correctly but must also make appropriate action decisions from the given options according to the context. Computational agents required to solve such games naturally arise in the form of natural language processing (NLP) systems trained with reinforcement learning (RL) algorithms. However, the intrinsic properties of text-based games such as partial observability, long-term dependencies, sparse reward signals, and large action spaces make it extremely challenging for RL-based autonomous agents to learn. Specifically, the chance of agents discovering optimal actions from potentially vast combinatorial action spaces is astronomically low (and approaches zero as the combinatorial space tends towards infinity).

A more rigorous framework for text-based games is provided as context for later discussions. Text-based games can be formally framed as partially observable Markov decision processes (POMDPs), represented as a 7-tuple of $\{S,T,A,\Omega,O,R,\gamma\}$ denoting the set of environment states, conditional transition probabilities, actions, observations, conditional observation probabilities, reward function, and discount factor, respectively. The player receives a textual observation $o_t \in \Omega$, determines a next step, and sends, typically as a textual phrase, the next step as an action $a_t$ to the environment. Most text-based games contain entities ($e_1, e_2, \ldots, e_M \in E$) such as items and locations, and players often take actions on themselves ("go east") or on items ("take dirty fork"). In choice-based games, a subset of text-based games, the player's response is limited to a short textual phrase selected from a list of admissible choices A.

Previous approaches to these text-based games have used external knowledge, sometimes referred to as "common sense," to constrain an agent's action outputs, effectively shrinking the size of the search space. The idea is to mimic human decision-making behavior. For example, when considering what to do next, people limit their selection of one of many (potentially unlimited) options based on their previous experience (so-called, "common sense"). In many cases, common sense results in a large (perhaps majority) of nonsensical options being eliminated, consciously or subconsciously, from contention. This strategy is evolutionarily successful because common sense enables us to efficiently prune the search space by eliminating a huge number of obvious mistakes or options. Notably, human-supplied common sense has been shown to improve sample efficiency and enables autonomous agents to perform look-ahead planning. However, these approaches have not yet clarified how common sense should actually be used. Specifically, a huge amount of common sense is given at once, regardless of the environment states, and the correspondence between the states and common sense data is unclear. This construction prevents agents from learning which common sense to use in which state, and the agents remember only the results after using common sense.

One or more embodiments of the present invention address one or more of the above-described shortcomings by providing computer-implemented methods, computing systems, and computer program products for extracting enriched target-oriented common sense from grounded graphs to support efficient next step decision making of an autonomous agent. Embodiments of the present invention leverage an RL-based mechanism which assumes that differences between observed environment states and common sense can provide a basis for action selection to further improve sample efficiency. In other words, embodiments of the present invention assume that a part of the environment states that is different from common sense should constitute one of the grounds for action selection.

In some embodiments, a novel agent (sometimes referred to as the Difference Graph Reinforcement Learning Agent, or "DiffG-RL"), is configured to construct a difference graph that organizes the environment states (i.e., an input(s)) and common sense (i.e., the knowledge base) by means of interactive objects with a dedicated graph encoder. The difference graph encodes an explicit representation of the difference between the current environment state and the common sense. The DiffGRL agent also contains a framework for extracting the appropriate amount and representation of common sense from the source knowledge base to support the construction of the difference graph itself. Selection of which portion of the common sense to extract is discussed further herein.

While certainly appropriate to solving next step decision making in text-based games, aspects of the present disclosure are applicable to a variety of the most difficult autonomous agent problems and are not meant to be particularly limited to the text-based environment. In other words, while embodiments of the DiffG-RL agent and difference graph construction itself are discussed in the context of text-based games, this is done for ease of discussion and illustration only. It should be understood that embodiments of the present invention, such as the construction and leveraging of difference graphs, can be leveraged outside of text-based games and can be applied to autonomous agents receiving input other than (or in addition to) texts. For example, autonomous agents can leverage the concepts described herein to make next action decisions using difference comparisons of visual data (e.g., between a received photo or video frame of a kitchen and a knowledge base including an image of a "clean" or desired state of the kitchen), audio data (e.g., between sampled audio data of water running from a tap and a knowledge base including example sounds before and after using a tap), or any other type of input data, such as, for example only, thermal data, pressure data, humidity data, timing data, etc.

Figure 1:
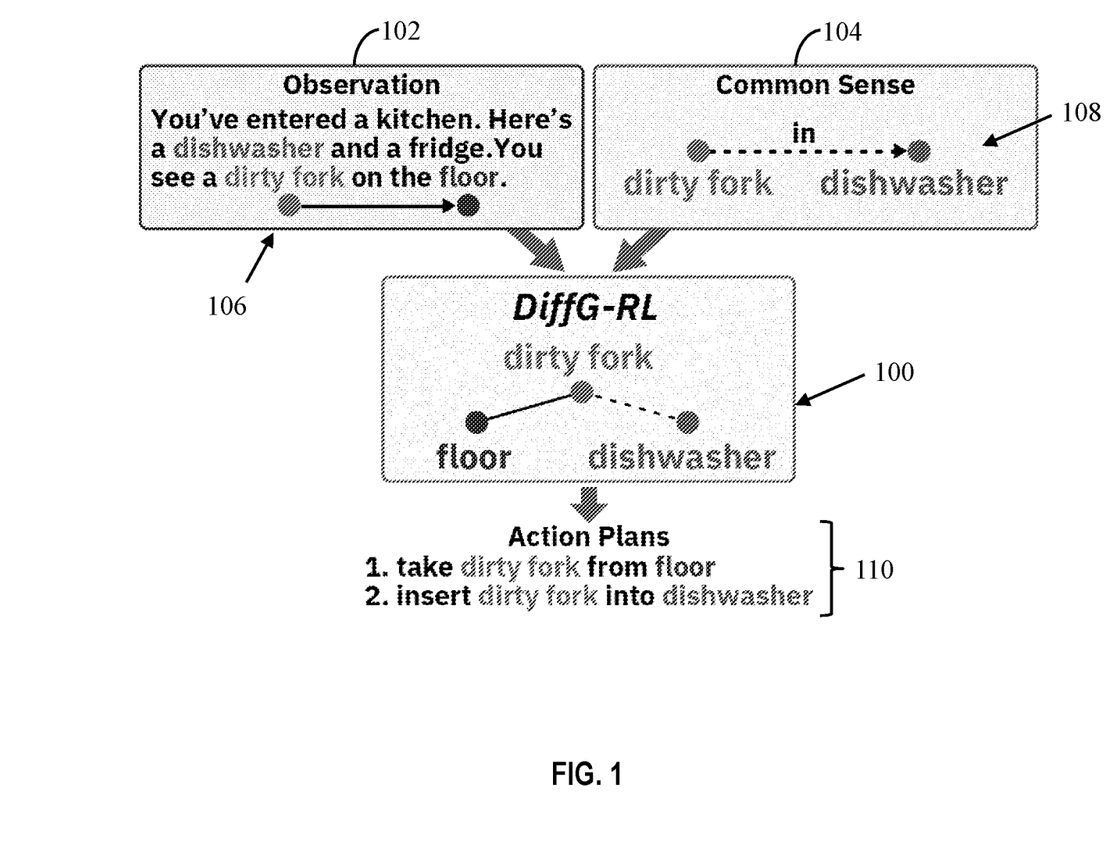
FIG. 1 illustrates an example difference graph constructed in accordance with one or more embodiments of the present invention.

FIG. 1 illustrates an example difference graph 100 constructed in accordance with one or more embodiments of the present invention. As shown in FIG. 1, the difference graph 100 is constructed from observation(s) 102 and common sense 104. The observation 102 can include any input, such as, for example, text, images, videos, audio data, and/or any other environmental data measured by or otherwise provided to an autonomous agent (not separately shown). For example, the observation 102 can include the text input, "You've entered a kitchen. Here's a dishwasher and a fridge. You see a dirty fork on the floor." In some embodiments, the observation 102 is represented by a knowledge graph 106 stored as triplets of {subject; relationship; object} (sometimes referred to as an entity or observation graph). For example, the observation 102 shown in FIG. 1 is represented as the knowledge graph triplet: {dirty fork; is on; floor}.

Common sense 104 can include a knowledge base that defines concept-rich associations between the autonomous agent itself, a plurality of objects, and their inter relationships. In some embodiments, each concept in the common sense 104 is represented by a knowledge graph 108 stored as triplets of {subject; relationship; object} (sometimes referred to as a common sense graph). For example, the common sense 104 shown in FIG. 1 is represented as the knowledge graph triplet: {dirty fork; goes in; dishwasher}. The extraction of the common sense data itself from one or more sources is discussed in greater detail herein.

As further shown in FIG. 1, the difference graph 100 summarizes the differences between the knowledge graph 106 and the knowledge graph 108 (i.e., the difference between the observation 102 and the common sense 104 as encoded in the graphs 106, 108). For example, the difference graph 100 shown in FIG. 1 is represented as a graph having nodes {floor}, {dirty fork}, and {dishwasher} and edges {is on} and {goes in}. Observe that the difference graph 100 encodes the knowledge graphs 106, 108 into a single connected graph.

In some embodiments, an autonomous agent (again, not shown in FIG. 1) leverages the difference graph 100 to create an action plan(s) 110. For example, the action plan 110 can include a first action (here, "take dirty fork from floor") and a second action (here, "insert dirty fork into dishwasher). Observe that the action plan 110 flows from a traversal of the difference graph 100. In particular, the action plan 110 includes one or more steps selected to change the state of the {dirty fork} subject from an observation state (i.e., on the floor) to a desired state (i.e., in the dishwasher).

Figure 2:
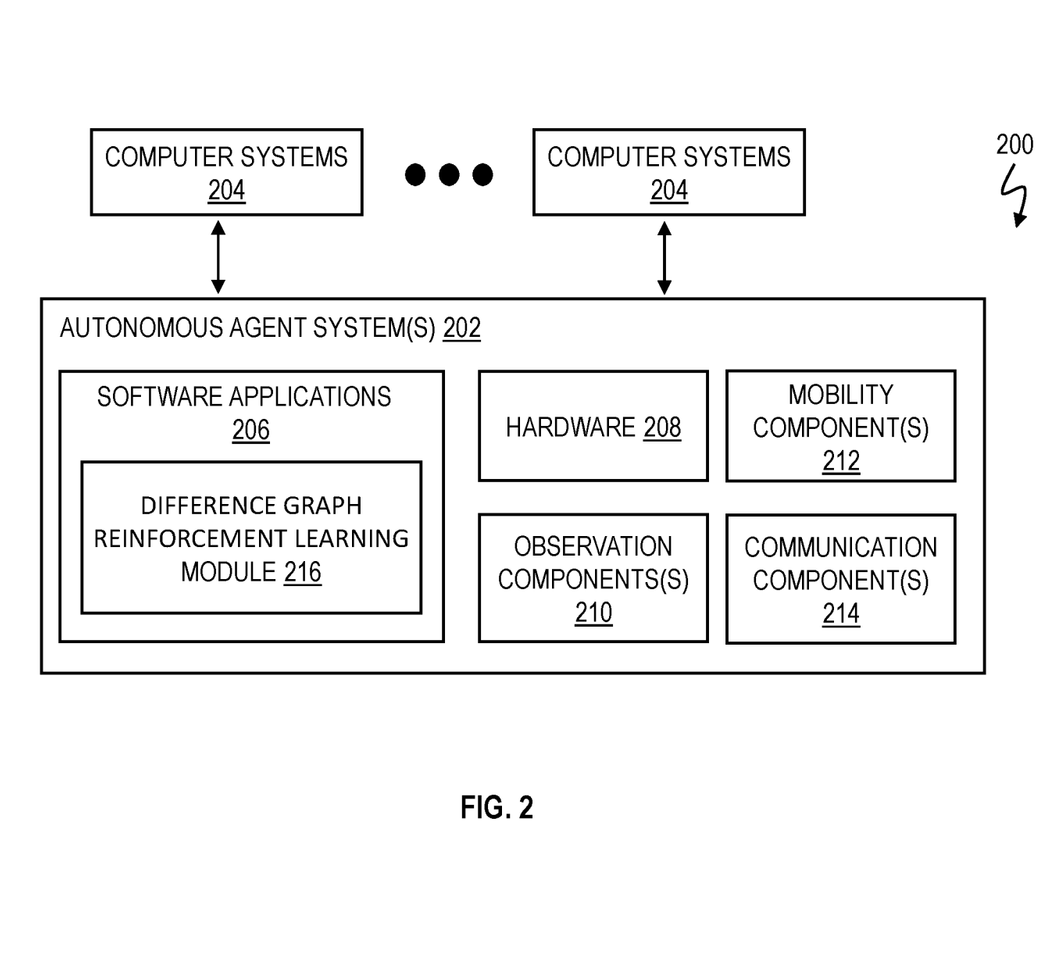
FIG. 2 is a block diagram of an autonomous agent configured to extract enriched target-oriented common sense from grounded graphs in accordance with one or more embodiments of the present invention.

FIG. 2 is a block diagram of an autonomous agent 200 configured to extract enriched target-oriented common sense from grounded graphs in accordance with one or more embodiments of the present invention. FIG. 2 depicts one or more autonomous agent system(s) 202 of the autonomous agent 200 coupled to one or more computer systems 204 via a wired and/or wireless network. For example, autonomous agent systems 202 can include one or more local computing systems (e.g., computer system 600 of FIG. 6), and computer systems 204 can be representative of one or more cloud-based resources (e.g. a source(s) for common sense). Elements of the computer system 600 of FIG. 6 may be used in and/or integrated into the computer systems 204 and the systems 202.

The autonomous agent systems 202 can include software applications 206, hardware 208, observation component(s) 210, mobility components 212, and communication components 214, although other subsystems are within the contemplated scope of the disclosure. Moreover, while the autonomous agent 200 is described herein within the context of a physical, robotic agent (i.e., constructed from a mixture of hardware and software) for ease of discussion, the autonomous agent 200 is not meant to be particularly limited. In some embodiments, the autonomous agent 200 is a computational agent (i.e., constructed entirely of software and logic). In other words, in some embodiments, one or more (possibly all) of the hardware and components of the autonomous agent 200 can be implemented virtually and/or in software.

Figure 6:
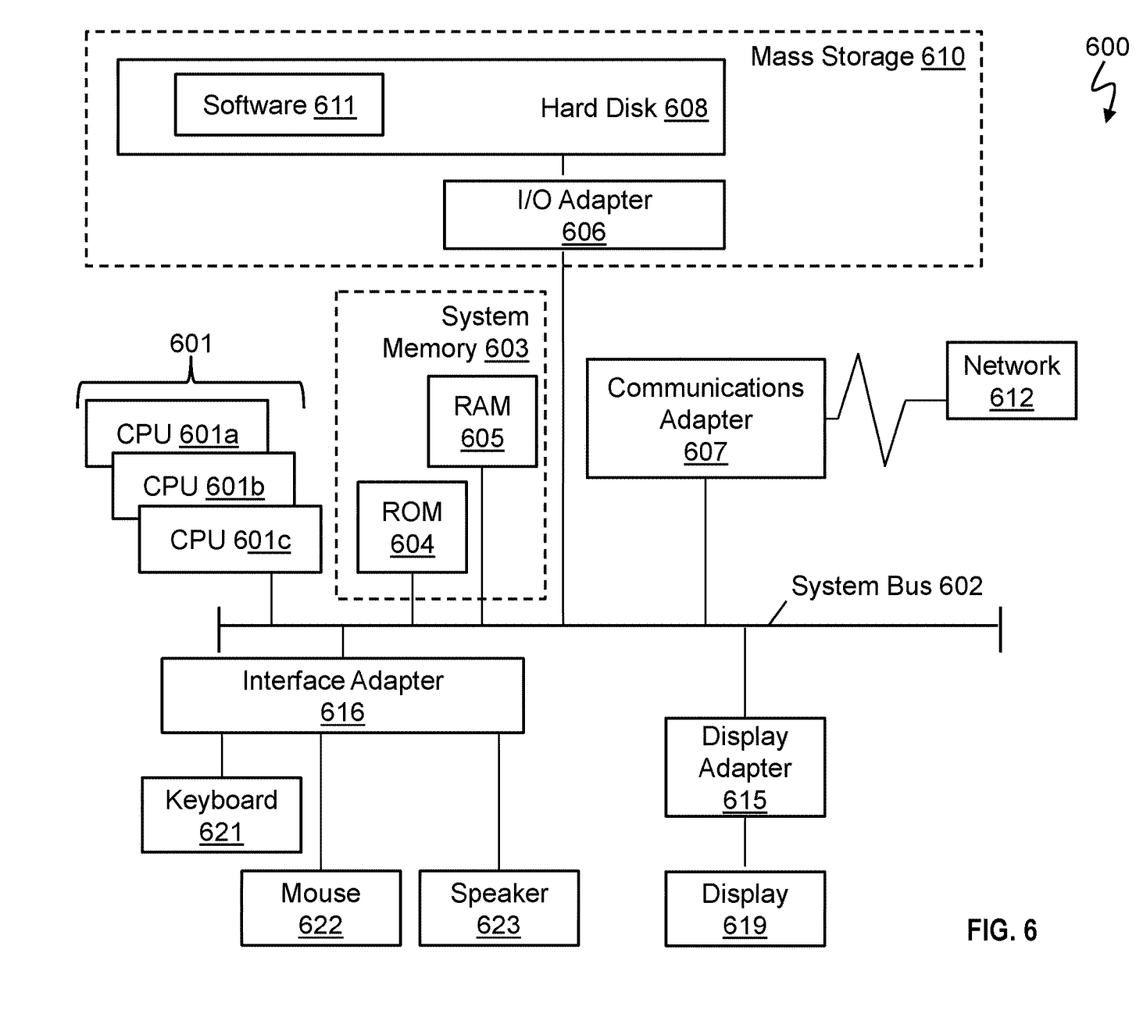
FIG. 6 depicts a block diagram of an example computer system for use in conjunction with one or more embodiments of the present invention.

The software applications 206 may utilize and/or be implemented as software 611 executed on one or more processors 601, as discussed in FIG. 6. In some embodiments, the software applications 206 can include a difference graph reinforcement learning module 216. In some embodiments, the autonomous agent 200 leverages the difference graph reinforcement learning module 216 to select a next action in response to one or more observations (e.g., an observation obtained using the observation components 210). The difference graph reinforcement learning module 216 is discussed in greater detail with respect to FIG. 3.

The hardware 208 can include, for example, the physical systems and processors required to operate the autonomous agent 200. In some embodiments, the hardware 208 includes one or more of the hardware components described with respect to the computer system 600 of FIG. 6.

The observation components 210 are not meant to be particularly limited and can include any of a variety of components configured to receive or otherwise obtain observations from an environment of the autonomous agent 200. For example, the observation components 210 can include any number and combination of cameras, microphones, pressure transducers and transmitters, piezometers, manometers, hygrometers, gas sensor(s) and olfaction systems, internal clocks, electrical and opto-electrical transducers, radiant transducers, etc.

The mobility components 212 are not meant to be particularly limited and can include any of a variety of components configured to allow the autonomous agent 200 to move freely throughout its environment. For example, the mobility components 212 can include any number and combination of wheels, treads, and electronic and/or conventional transmissions, engines, batteries, drivetrains, etc.

The communication components 214 are not meant to be particularly limited and can include any of a variety of components configured to allow the autonomous agent 200 to communicate with one or more external agents, systems, or users. For example, the communication components 214 can include networking devices (e.g., communications adapter 607 of FIG. 6), speakers, displays, etc.

Figure 3:
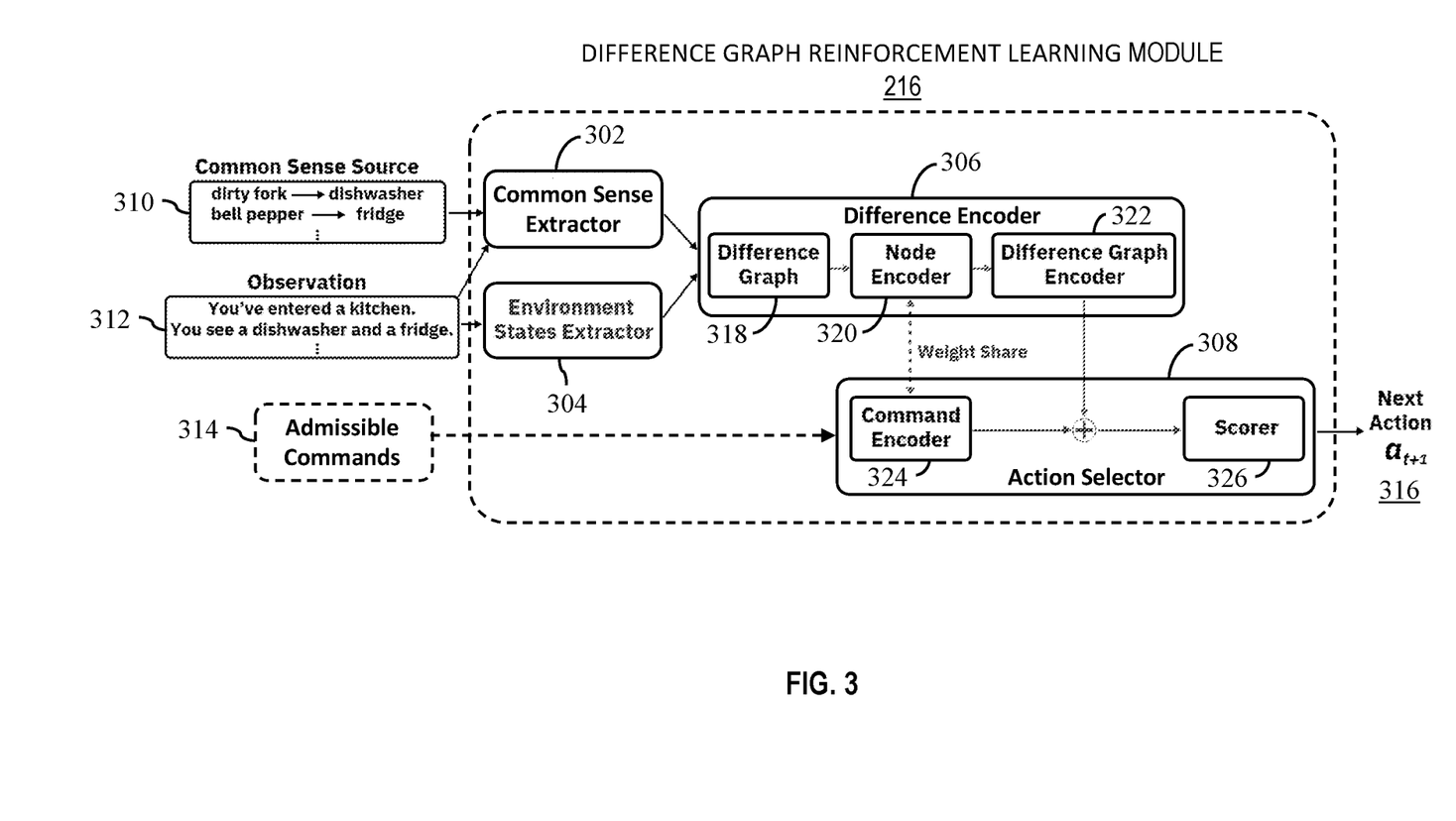
FIG. 3 is a block diagram of the difference graph reinforcement learning module of FIG. 2 configured in accordance with one or more embodiments of the present invention.

FIG. 3 is a block diagram of the difference graph reinforcement learning module 216 of FIG. 2 configured in accordance with one or more embodiments of the present invention. As shown in FIG. 3, the difference graph reinforcement learning module 216 includes four components: the common sense extractor 302, the environment states extractor 304, the difference encoder 306, and the action selector 308. As further shown in FIG. 3, inputs to the difference graph reinforcement learning module 216 include: common sense source data 310, observation data 312, and optionally, admissible commands 314. Output from the difference graph reinforcement learning module 216 includes a next action 316 (denoted $a_{t+1}$).

The common sense extractor 302 is configured for extracting the appropriate amount and representations of common sense from the common sense source 310 to facilitate efficient comparisons between the observation data 312 (i.e., environment states) and common sense source data 310 (i.e., the common sense knowledge base). The form of the common sense source 310 is not meant to be particularly limited, and can include, for example, one or more knowledge graphs. In some embodiments, the common sense source 310 includes one or more grounded graphs, such as, for example, as in the Visual Genome dataset. In some embodiments, the common sense source 310 includes the Visual Genome dataset.

Observe that giving the autonomous agent 200 access to all available common sense at once is excessive and inefficient for solving many tasks, as some portion of the common sense will not be relevant to the present circumstances. To address this perception, in some embodiments, the extracted amount of common sense is less (or even far less, such as, for example, 50%, 25%, 10%, 5%, 1%, 0.5%, 0.1%, etc.) of all common sense available in the common sense source data 310. Observe further that requiring perfect matches between common sense graphs ($c_1, c_2, \ldots, c_N \in C$) and observed entities ($e_1, e_2, \ldots, e_M \in E$) is not practical for solving generalized tasks (i.e., tasks which are not predefined), as common sense will rarely include a perfect representation of an observation.

To address these perceptions, in some embodiments, the common sense extractor 302 extracts common sense based on word meanings and the context of current interactions with the tasks, objections, and/or environments (e.g., the circumstances of the current game), independent of linguistic representation, to broaden the scope of common sense extraction. In addition, in some embodiments, the common sense extractor 302 can force unified representations of environment states and common sense to help agents understand the correspondences between them.

To extract the appropriate amount and representation of common sense, the common sense extractor 302 leverages a framework consisting of three components: extracting by meaning (EbM), narrowing by circumstances (NbC), and transforming into grounded representation (TGR). Each will be discussed in turn.

At the first step, extracting by meaning, the common sense extractor 302 utilizes the similarity between vectors obtained by word embedding instead of spell matching. The word embedding vector similarity sim is represented in equation (1) as:

$$\sin(s_i, e_j) = \frac{s_i, e_j}{|s_i||e_j|}, \quad (1)$$

where $s_i$ is a subject in a common sense graph $c_i$ and $e_j$ represents an entity. The bolded terms in equation (1) represent vectors obtained by word embedding. If the similarity sim is greater than a preset threshold, the respective subject $s_i$ and entity $e_i$ are considered to have a similar meaning. The similarity sim can be calculated in this manner for all combinations $(s_i, e_i)$.

In some embodiments, $s_i$ is then replaced with an object of in the common sense graph and sim is recalculated. If both $s_i$ and $o_i$ are similar to one $e_i$ in E, its common sense graph $c_i$ is extracted. Note that leveraging EbM in this manner relaxes the constraints on common sense much more than with exact matching. Consequently, the number of extracted common sense graphs will be larger (potentially enormous). In many cases, it is advantageous to prune the number of extracted common sense graphs from EbM using NbC and/or TGR.

For NbC, the common sense extractor 302 retains only those graphs that are in line with an understanding of the present contextual circumstances (e.g., for a text based game, graphs that are in line with the game's "interactive object"→"object's state" implementation/framework). For example, in many text-based games, "interactive object"→"location" are possible transitions (e.g., dirty fork→dishwasher) while "location"→"location" transitions are not permitted (e.g., agents cannot move the dishwasher into the fridge). In other words, and continuing with the prior example, the common sense extractor 302 can eliminate all graphs that do not match the "interactive object"→"location" paradigm.

For TGR, the common sense extractor 302 transforms the subject $s_i$ and object of in the extracted common sense graph into the entities to which they correspond in the EbM component. For example, in the case of equation (1) above, $s_i$ is transformed into $e_j$. TGR transformations advantageously eliminate the influence of differences between the extracted common sense and a games' representations and clarifies the correspondence between the environment states and common sense.

The environment states extractor 304 is configured for extracting the current state(s) of the environment from the observation(s) $o_t$. Continuing with the prior example of text-based games, environment states can be represented as a dynamic knowledge graph, as the states in text-based games have a graph-like structure.

In some embodiments, interactive objects $(io_1, io_2, \ldots, io_p \in I_t)$ are defined as those items which allow an agent to interact directly with the surrounding environment. Interactive objects can include, for example, a dirty fork that the player can pick up. In some embodiments, the environment states extractor 304 connects these interactive objects to their respective state nodes (e.g., to the location object denoting where the respective item is currently located) to define one or more knowledge graphs (in a similar manner as discussed, e.g., with respect to the knowledge graphs 106, 108) and then separates them from the entities $(I_t \subset E_t)$.

In some embodiments, the environment states extractor 304 extracts the states of interactive objects from observation text by using an Abstract Meaning Representation (AMR) parser. In some embodiments, the environment states extractor 304 adds a node representing the autonomous agent (i.e., the player, "You" or "Self") and attaches the "self" node to an interactive object when a respective interactive object is in the possession of the autonomous agent (in a text-based game, in a player inventory). At each step, the entities $E_t$, the interactive objects $Io_t$, and their current states are updated within the knowledge graphs on the basis of the observations $o_i$. In this manner the current state of all interactive objects can be tracked.

The difference encoder 306 is configured for generating a difference graph 318 that represents the difference between the environment states and common sense. The difference graph 318 can be used to select common sense according to the states and to obtain the basis for the next action plan.

Figure 4:
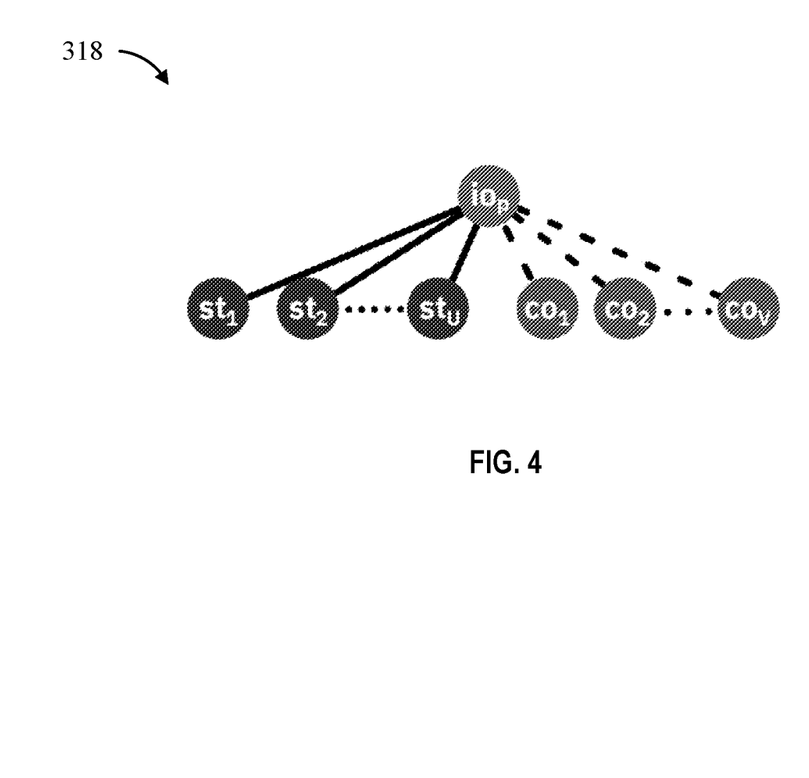
FIG. 4 illustrates an example embodiment of the difference graph in accordance with one or more embodiments of the present invention.

In some embodiments, the outputs of the common sense extractor 302 and the environment states extractor 304 are organized in the difference graph 318 by interactive objects $(io_1, io_2, \ldots, io_p \in I_t)$. FIG. 4 illustrates an example embodiment of the difference graph 318 organized with respect to the interactive object $io_p$. As shown in FIG. 4, the difference graph 318 contains three types of nodes, with multiple current state nodes $(st_1, st_2, \ldots, st_U \in U(p))$ and common sense nodes $(co_1, co_2, \ldots, co_V \in V(p))$ corresponding to one interactive object node $(io_p)$. For edges, there are two types: interactive object-current state (represented in FIG. 4 by a solid line) and interactive object-common sense (represented in FIG. 4 by a dashed line). Remember that, after the TGR operation as described above, the common sense nodes $co_i$ have the same representation as the entities $e_i$. The difference graph 318 can be updated in accordance with the observations of (e.g., new texts) at each time step, in a similar manner as the state updates for the environment states extractor 304.

The node encoder 320 is configured for converting the word(s) in a node (any/all of the current state nodes, common sense nodes, interactive object nodes) of the difference graph 318 into a series of vectors by word embedding and obtaining a fixed length for each respective vector. In some embodiments, the node encoder 320 uses the fixed-length vector as an initial feature of each node in a difference graph encoder 322. Word(s) can be converted using known processes, such as, for example, a bidirectional gated recurrent unit (GRU).

The difference graph encoder 322 is configured to generate an encoding of the difference graph 318. In some embodiments, the difference graph encoder 322 updates one or more features of a node by aggregating the features of its neighbors (i.e., the adjacent nodes and/or k-nearest nodes). The aggregate from the difference graph encoder 322 can be generated using known processes, such as, for example, using a Graph Isomorphism Network (GIN). The aggregate can be calculated according to equation (2) as:

$$h_{io_p}^{(k)} = MLP\{\phi(1+W_I)h_{io_p}^{(k-1)} + \phi(W_{ST}h_{st_u}^{(k-1)}) + \phi(W_{CO}h_{co_v}^{(k-1)})\} \quad (2)$$

Where $h_X^{(k)}$ represents the feature of X node with k iterations of the aggregation, $\phi$ represents an activation function, and MLP represents multi-layer perceptrons.

In some embodiments, to distinguish between the three types of nodes and to represent the difference between the current state and common sense, different learnable parameters are provided for each type: $W_I$, $W_{ST}$, and $W_{CO}$. Since the actions are based on the interactive objects, the difference graph encoder 322 only aggregates for the interactive object $io_p$. In GIN, one MLP is used after the product with the learnable parameter because MLPs can represent a composition of functions, but we add an activation function ϕ for output simplification and training stability.

In some embodiments, the aggregation can be repeated to reflect the features of distant nodes. As a result, the difference graph encoder 322 can handle the environment states and common sense even if they become subgraphs consisting of multiple nodes.

The action selector 308 is configured to calculate the selection probability of each action from the concatenation of the vector representation $a_t^i$ of the admissible command $a_t^i \in A_t$ and the output $d_t$ of the difference graph encoder 322. In some embodiments, $a_t^i$ is obtained by word embedding using the command encoder 324, in a similar manner to the node encoder 320 discussed with respect to the difference encoder 306. In some embodiments, the action selector 308 uses the bidirectional GRU for the command encoder 324 and shares one or more weight(s) with the node encoder 320. The scorer 326 consists of two MLP layers, a dropout layer, and an activation layer and calculates the probability $p_{a_t^i} = \text{Scorer}(a_t^i, d_t)$.

Figure 5:
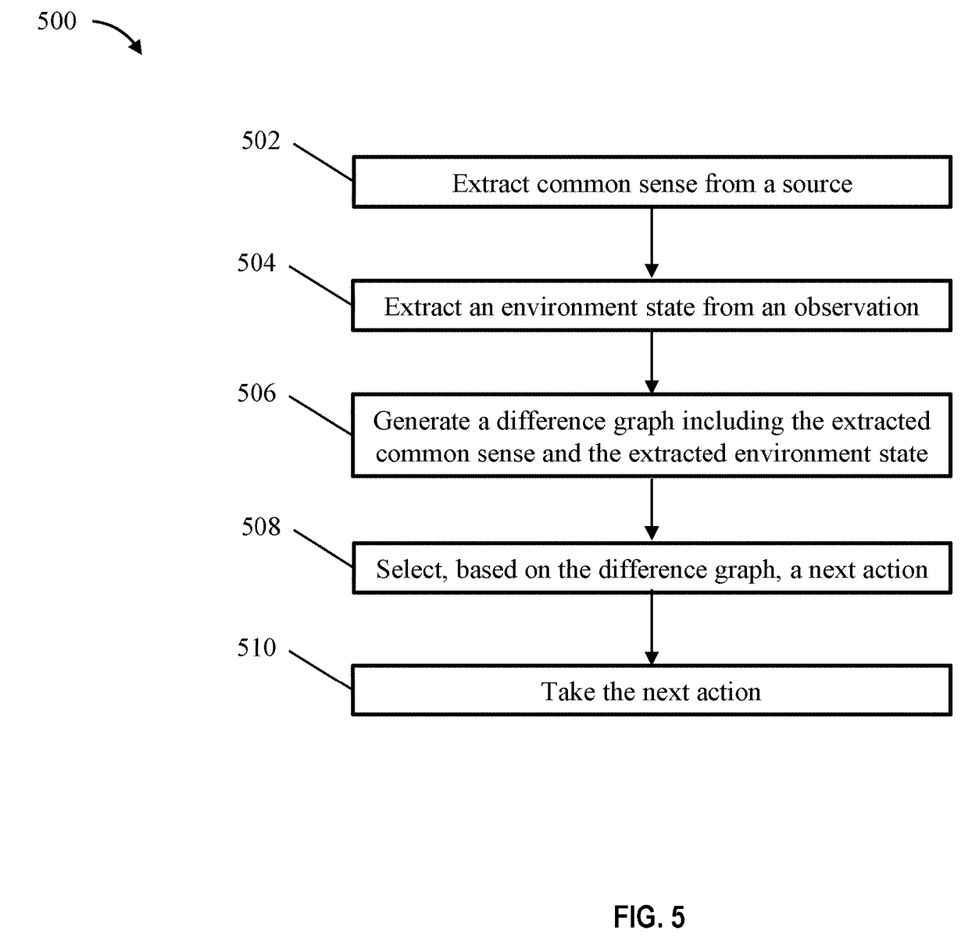
FIG. 5 is a flowchart in accordance with one or more embodiments of the present invention.

Referring now to FIG. 5, a flowchart 500 for extracting enriched target-oriented common sense from grounded graphs to support efficient next step decision making of an autonomous agent is generally shown according to an embodiment. The flowchart 500 is described in reference to FIGS. 1-4 and may include additional blocks not depicted in FIG. 5. Although depicted in a particular order, the blocks depicted in FIG. 5 can be rearranged, subdivided, and/or combined.

At block 502, the autonomous agent extracts common sense from a source. The extracted common sense can include a first knowledge graph. In some embodiments, the first knowledge graph of the extracted common sense is represented as a triplet of {subject, relationship, object}.

In some embodiments, extracting the common sense includes extracting by meaning. In some embodiments, extracting by meaning includes extracting a knowledge graph from the source when both a similarity of a subject in a respective common sense graph of the source and a similarity of an object in the respective common sense graph of the source to an entity exceeds a threshold.

In some embodiments, extracting the common sense further includes narrowing by circumstances. In some embodiments, narrowing by circumstances includes retaining only those knowledge graphs from the extracted common sense that represent valid actions.

In some embodiments, extracting the common sense further includes transforming into a grounded representation. In some embodiments, transforming into a grounded representation includes transforming the subject in the respective common sense graph of the source to the respective entity.

At block 504, the autonomous agent extracts an environment state from an observation. The extracted environment state can include a second knowledge graph. The second knowledge graph can include an interactive object and a state of the interactive object.

At block 506, the autonomous agent generates a difference graph representing the extracted common sense and the extracted environment state. In some embodiments, generating the difference graph includes organizing the extracted common sense and the extracted environment states by interactive objects.

In some embodiments, the difference graph includes a plurality of current state nodes, a plurality of common sense nodes, and a single interactive object node. In some embodiments, the difference graph includes interactive object-current state edges and interactive object-common sense edges.

At block 508, the autonomous agent selects, based on the difference graph, a next action. At block 510, the autonomous agent takes the next action. The next action is not meant to be particularly limited but could include, for example, interacting with an object (e.g., picking up an object, putting an object in a particular location, manipulating the object, etc.) or location (e.g., moving to/from a location, etc.).

The method can further include encoding the difference graph. In some embodiments, encoding the difference graph includes converting one or more words in a node of the difference graph into a series of vectors by word embedding.

Turning now to FIG. 6, a computer system 600 is generally shown in accordance with one or more embodiments of the invention. The computer system 600 can be an electronic, computer framework comprising and/or employing any number and combination of computing devices and networks utilizing various communication technologies, as described herein. The computer system 600 can be scalable, extensible, and modular, with the ability to change to different services or reconfigure some features independently of others. The computer system 600 may be, for example, a server, desktop computer, laptop computer, tablet computer, or smartphone. In some examples, computer system 600 may be a cloud computing node (e.g., a node 10 of FIG. 7 below). Computer system 600 may be described in the general context of computer system executable instructions, such as program modules, being executed by a computer system. Generally, program modules may include routines, programs, objects, components, logic, data structures, and so on that perform particular tasks or implement particular abstract data types. Computer system 600 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, the computer system 600 has one or more central processing units (CPU(s)) 601a, 601b, 601c, etc., (collectively or generically referred to as processor(s) 601). The processors 601 can be a single-core processor, multi-core processor, computing cluster, or any number of other configurations. The processors 601, also referred to as processing circuits, are coupled via a system bus 602 to a system memory 603 and various other components. The system memory 603 can include a read only memory (ROM) 604 and a random access memory (RAM) 605. The ROM 604 is coupled to the system bus 602 and may include a basic input/output system (BIOS) or its successors like Unified Extensible Firmware Interface (UEFI), which controls certain basic functions of the computer system 600. The RAM is read-write memory coupled to the system bus 602 for use by the processors 601. The system memory 603 provides temporary memory space for operations of said instructions during operation. The system memory 603 can include random access memory (RAM), read only memory, flash memory, or any other suitable memory systems.

The computer system 600 comprises an input/output (I/O) adapter 606 and a communications adapter 607 coupled to the system bus 602. The I/O adapter 606 may be a small computer system interface (SCSI) adapter that communicates with a hard disk 608 and/or any other similar component. The I/O adapter 606 and the hard disk 608 are collectively referred to herein as a mass storage 610.

Software 611 for execution on the computer system 600 may be stored in the mass storage 610. The mass storage 610 is an example of a tangible storage medium readable by the processors 601, where the software 611 is stored as instructions for execution by the processors 601 to cause the computer system 600 to operate, such as is described herein below with respect to the various Figures. Examples of computer program product and the execution of such instruction is discussed herein in more detail. The communications adapter 607 interconnects the system bus 602 with a network 612, which may be an outside network, enabling the computer system 600 to communicate with other such systems. In one embodiment, a portion of the system memory 603 and the mass storage 610 collectively store an operating system, which may be any appropriate operating system to coordinate the functions of the various components shown in FIG. 6.

Additional input/output devices are shown as connected to the system bus 602 via a display adapter 615 and an interface adapter 616. In one embodiment, the adapters 606, 607, 615, and 616 may be connected to one or more I/O buses that are connected to the system bus 602 via an intermediate bus bridge (not shown). A display 619 (e.g., a screen or a display monitor) is connected to the system bus 602 by the display adapter 615, which may include a graphics controller to improve the performance of graphics intensive applications and a video controller. A keyboard 621, a mouse 622, a speaker 623, etc., can be interconnected to the system bus 602 via the interface adapter 616, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 6, the computer system 600 includes processing capability in the form of the processors 601, and, storage capability including the system memory 603 and the mass storage 610, input means such as the keyboard 621 and the mouse 622, and output capability including the speaker 623 and the display 619.

In some embodiments, the communications adapter 607 can transmit data using any suitable interface or protocol, such as the internet small computer system interface, among others. The network 612 may be a cellular network, a radio network, a wide area network (WAN), a local area network (LAN), or the Internet, among others. An external computing device may connect to the computer system 600 through the network 612. In some examples, an external computing device may be an external webserver or a cloud computing node.

It is to be understood that the block diagram of FIG. 6 is not intended to indicate that the computer system 600 is to include all of the components shown in FIG. 6. Rather, the computer system 600 can include any appropriate fewer or additional components not illustrated in FIG. 6 (e.g., additional memory components, embedded controllers, modules, additional network interfaces, etc.). Further, the embodiments described herein with respect to computer system 600 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
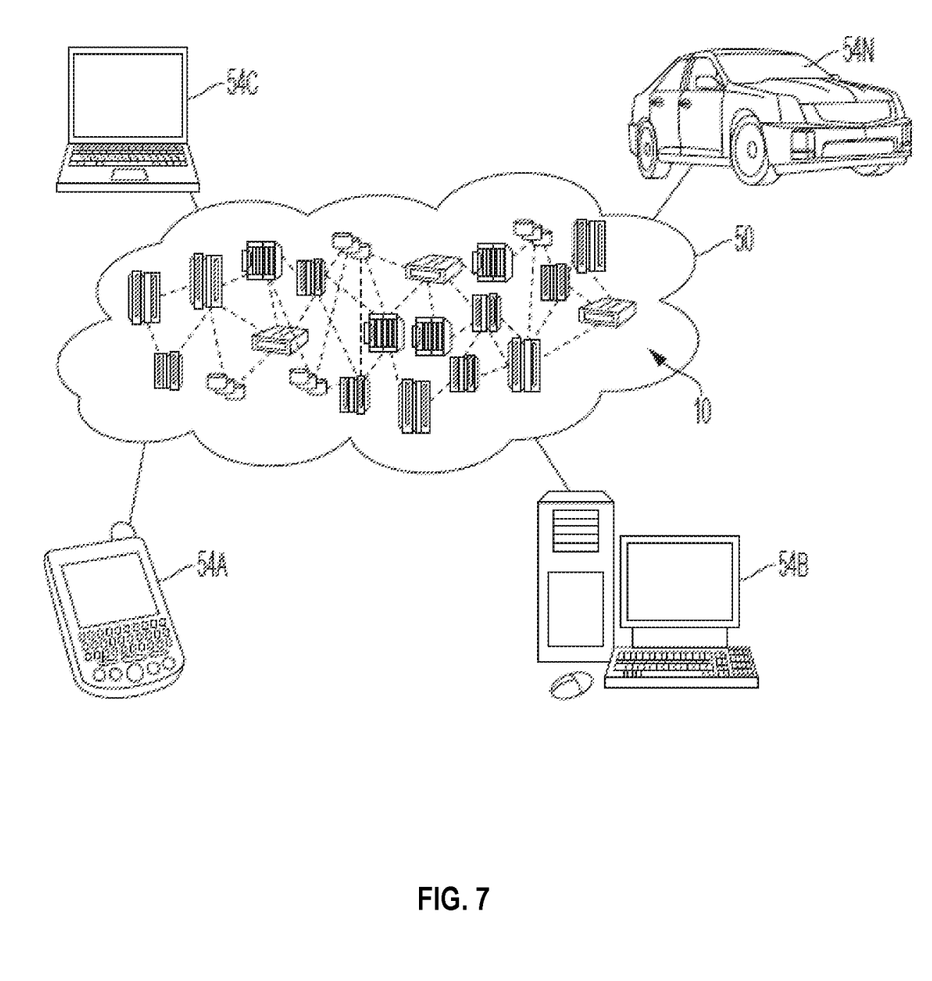
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
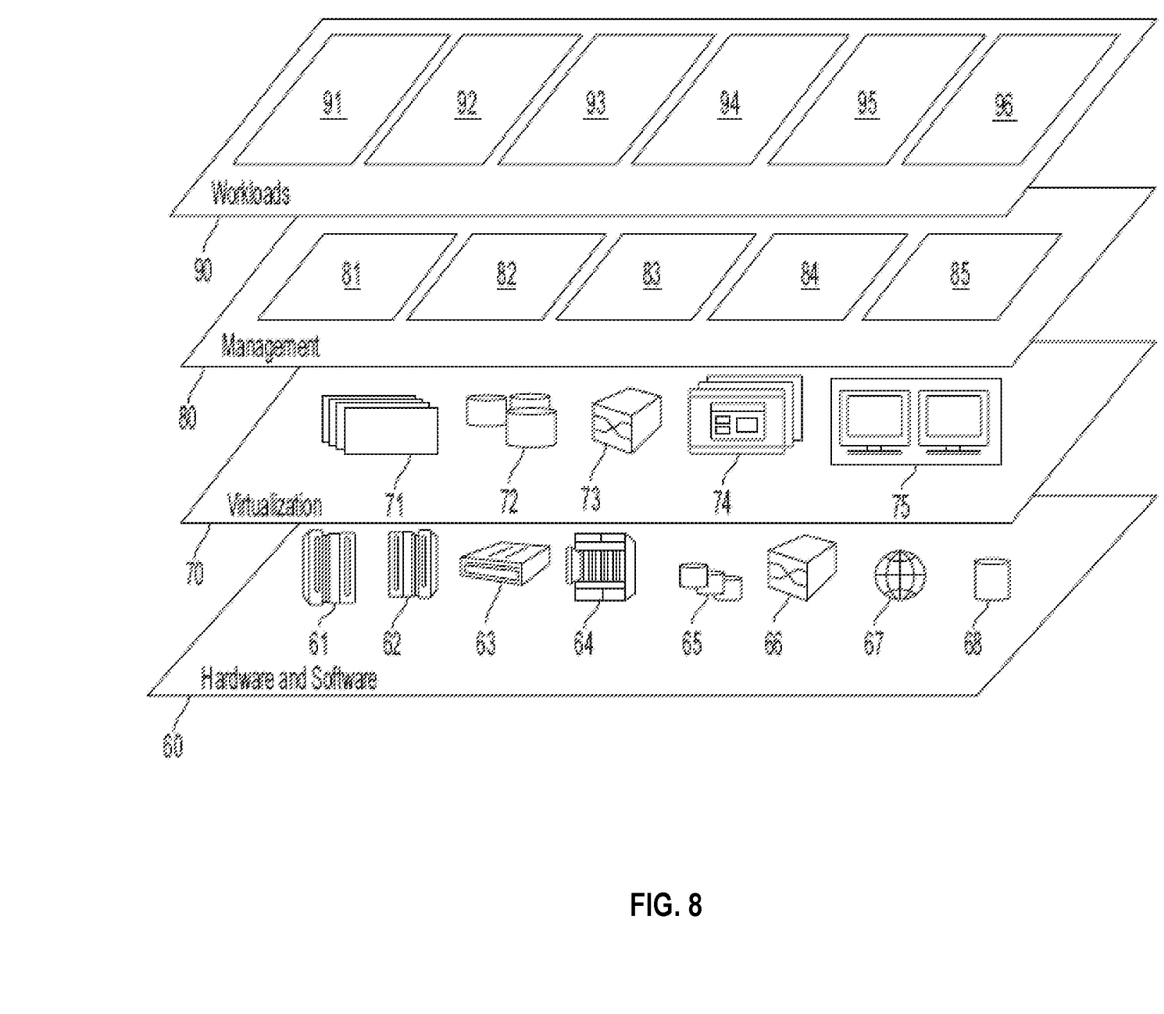
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   extracting, by an autonomous agent, common sense from a source, the extracted common sense comprising a first knowledge graph;
   extracting, by the autonomous agent, an environment state from an observation, the extracted environment state comprising a second knowledge graph, the second knowledge graph comprising an interactive object and a state of the interactive object;
   generating, by the autonomous agent, a difference graph comprising the extracted common sense and the extracted environment state, the difference graph encoding the extracted common sense and the extracted environment state in a single connected graph;
   selecting, by the autonomous agent and based on the difference graph, a next action; and
   taking, by the autonomous agent, the next action.

2. The computer-implemented method of claim 1, wherein the first knowledge graph of the extracted common sense is represented as a triplet of {subject, relationship, object}.

3. The computer-implemented method of claim 1, wherein extracting the common sense comprises extracting by meaning, wherein extracting by meaning comprises extracting a knowledge graph from the source when both a similarity of a subject in a respective common sense graph of the source and a similarity of an object in the respective common sense graph of the source to an entity exceeds a threshold.

4. The computer-implemented method of claim 3, wherein extracting the common sense further comprises narrowing by circumstances, wherein narrowing by circumstances comprises retaining only those knowledge graphs from the extracted common sense that represent valid actions.

5. The computer-implemented method of claim 3, wherein extracting the common sense further comprises transforming into a grounded representation, wherein transforming into a grounded representation comprises transforming the subject in the respective common sense graph of the source to the respective entity.

6. The computer-implemented method of claim 1, wherein generating the difference graph comprises organizing the extracted common sense and the extracted environment states by interactive objects.

7. The computer-implemented method of claim 6, wherein the difference graph comprises a plurality of current state nodes, a plurality of common sense nodes, and a single interactive object node, and wherein the difference graph comprises interactive object-current state edges and interactive object-common sense edges.

8. The computer-implemented method of claim 1, further comprising encoding the difference graph, wherein encoding the difference graph comprises converting one or more words in a node of the difference graph into a series of vectors by word embedding.

9. A system comprising an autonomous agent having a memory, computer readable instructions, and one or more processors for executing the computer readable instructions, the computer readable instructions controlling the one or more processors to perform operations comprising:
    extracting common sense from a source, the extracted common sense comprising a first knowledge graph;
    extracting an environment state from an observation, the extracted environment state comprising a second knowledge graph, the second knowledge graph comprising an interactive object and a state of the interactive object;
    generating a difference graph comprising the extracted common sense and the extracted environment state, the difference graph encoding the extracted common sense and the extracted environment state in a single connected graph;
    selecting, based on the difference graph, a next action; and
    taking, by the autonomous agent, the next action.

10. The system of claim 9, wherein the first knowledge graph of the extracted common sense is represented as a triplet of {subject, relationship, object}.

11. The system of claim 9, wherein extracting the common sense comprises extracting by meaning, wherein extracting by meaning comprises extracting a knowledge graph from the source when both a similarity of a subject in a respective common sense graph of the source and a similarity of an object in the respective common sense graph of the source to an entity exceeds a threshold.

12. The system of claim 11, wherein extracting the common sense further comprises narrowing by circumstances, wherein narrowing by circumstances comprises retaining only those knowledge graphs from the extracted common sense that represent valid actions.

13. The system of claim 11, wherein extracting the common sense further comprises transforming into a grounded representation, wherein transforming into a grounded representation comprises transforming the subject in the respective common sense graph of the source to the respective entity.

14. The system of claim 9, wherein generating the difference graph comprises organizing the extracted common sense and the extracted environment states by interactive objects.

15. The system of claim 14, wherein the difference graph comprises a plurality of current state nodes, a plurality of common sense nodes, and a single interactive object node, and wherein the difference graph comprises interactive object-current state edges and interactive object-common sense edges.

16. The system of claim 9, further comprising encoding the difference graph, wherein encoding the difference graph comprises converting one or more words in a node of the difference graph into a series of vectors by word embedding.

17. A computer program product comprising a computer readable storage medium having program instructions embodied therewith, the program instructions executable by one or more processors to cause the one or more processors to perform operations comprising:
    extracting, by an autonomous agent, common sense from a source, the extracted common sense comprising a first knowledge graph;
    extracting, by the autonomous agent, an environment state from an observation, the extracted environment state comprising a second knowledge graph, the second knowledge graph comprising an interactive object and a state of the interactive object;
    generating, by the autonomous agent, a difference graph comprising the extracted common sense and the extracted environment state, the difference graph encoding the extracted common sense and the extracted environment state in a single connected graph;
    selecting, by the autonomous agent and based on the difference graph, a next action; and
    taking, by the autonomous agent, the next action.

18. The computer program product of claim 17, wherein the first knowledge graph of the extracted common sense is represented as a triplet of {subject, relationship, object}.

19. The computer program product of claim 17, wherein extracting the common sense comprises extracting by meaning, wherein extracting by meaning comprises extracting a knowledge graph from the source when both a similarity of a subject in a respective common sense graph of the source and a similarity of an object in the respective common sense graph of the source to an entity exceeds a threshold.

20. The computer program product of claim 19, wherein extracting the common sense further comprises narrowing by circumstances, wherein narrowing by circumstances comprises retaining only those knowledge graphs from the extracted common sense that represent valid actions.

* * * * *